(12) United States Patent
Bråthe et al.

(10) Patent No.: US 7,954,576 B2
(45) Date of Patent: Jun. 7, 2011

(54) VEHICLE DRIVE LINE

(75) Inventors: Lars Bråthe, Gothenburg (SE); Anders Hedman, Marstrand (SE); Hans Stervik, Kärna (SE); Lena Larsson, Västra Frölunda (SE)

(73) Assignee: Volvo Lastvagnar AB, Gothenburg (SE)

( * ) Notice: Subject to any disclaimer, the term of this patent is extended or adjusted under 35 U.S.C. 154(b) by 495 days.

(21) Appl. No.: 11/914,568

(22) PCT Filed: Jun. 15, 2005

(86) PCT No.: PCT/SE2005/000935
§ 371 (c)(1),
(2), (4) Date: Nov. 16, 2007

(87) PCT Pub. No.: WO2006/135287
PCT Pub. Date: Dec. 21, 2006

(65) Prior Publication Data
US 2008/0245585 A1    Oct. 9, 2008

(51) Int. Cl.
*B60K 17/08* (2006.01)
(52) U.S. Cl. .................. 180/24.04; 180/291; 180/376
(58) Field of Classification Search .......... 180/24.04, 180/24.05, 22, 23, 226, 231, 239–241, 251, 180/267, 291, 342, 375, 376
See application file for complete search history.

(56) References Cited

U.S. PATENT DOCUMENTS

| | | | | |
|---|---|---|---|---|
| 4,914,979 A | * | 4/1990 | Balmforth | 475/221 |
| 5,417,297 A | * | 5/1995 | Auer | 180/24.11 |
| 5,697,264 A | * | 12/1997 | Andrews et al. | 74/665 GB |
| 5,775,448 A | * | 7/1998 | Hirahara et al. | 180/24.02 |
| 5,897,601 A | * | 4/1999 | Suzuki | 701/78 |
| 5,950,750 A | * | 9/1999 | Dong et al. | 180/24.09 |
| 6,752,235 B1 | * | 6/2004 | Bell et al. | 180/360 |
| 7,096,990 B2 | * | 8/2006 | Borgen et al. | 180/247 |
| 7,108,086 B2 | * | 9/2006 | Hurlburt | 180/22 |
| 7,276,015 B2 | * | 10/2007 | Stervik | 477/110 |
| 2002/0040621 A1 | * | 4/2002 | Braud | 74/665 GA |
| 2002/0193197 A1 | * | 12/2002 | Weisz | 475/5 |

FOREIGN PATENT DOCUMENTS

| | | | | |
|---|---|---|---|---|
| FR | 2553169 A | * | 4/1985 | |
| JP | 4087836 A | | 3/1992 | |

OTHER PUBLICATIONS

Miyasaka Junichi, Automobile Driving Force Transmission System, Mar. 19, 1992, Japan Patent Office, JP 4-87836, English translation of Patent.*
A. Marcel, et al., Lubrication system for differential gearbox has bearing bushes of phosphor bronze having pits filled with lubricant, Apr. 12, 1985, FR 2 553 169 A, English translation of Abstract.*
International Search Report for corresponding International Application PCT/SE2005/000935.
International Preliminary Report on Patentability for corresponding International Application PCT/SE2005/000935.

* cited by examiner (Continued)

*Primary Examiner* — Paul N Dickson
*Assistant Examiner* — James English
(74) *Attorney, Agent, or Firm* — WRB-IP LLP

(57) ABSTRACT

A vehicle includes a front axle and rear axle, where at least one of said axles is driven, an engine arranged in the vicinity of the rear or front end of said vehicle, the engine including an output shaft connected to the driven axle via a transmission system for transmitting driving power from the engine to the driven axle. The transmission system includes at least a multiple-speed gearbox for causing variable gear ratio between the engine and driven axle. The engine and at least a part of the gearbox are arranged on each side of the driven axle, and are connected only via a power transmitting device so that an engine block of the engine is separated from a gearbox housing of the gearbox.

13 Claims, 6 Drawing Sheets

VEHICLE DRIVE LINE

BACKGROUND AND SUMMARY

The present invention relates to the placing of a multiple-speed gearbox included in a drive line for vehicles such as trucks, buses, dumpers, haulers with articulated steering, wheel loaders, and which have at least one driven axle.

Normally, in trucks the engine is placed above the front axle of the vehicle. The multiple-speed gearbox is attached to the engine and the driving power is transmitted via a propeller shaft system to one or several driven rear axles. The engine and the gearbox can together amount up to one quarter of the tare weight of the vehicle. Therefore the placement of the engine and the gearbox between themselves and relative to the rest of the vehicle strongly affects those shares of the tare weight of the vehicle that are carried by the front and rear axles respectively. In future trucks the load on the front axle will tend to increase due to, e.g. supplementary equipment that will be needed to meet future exhaust emission legislation. Increased load on the front axle gives e.g. the following negative consequences:

increased wear on tires of the front wheels, —more difficult to load the vehicle with cargo, since the load on the front axle already is near maximum or over legal or practical load for front axle, —big share of vehicle tare weight on front axle gives low traction and driving ability for driven rear axle (especially in unloaded and partly loaded conditions), an increased load on the front wheels demands greater tire dimensions, which gives increased steering forces and a decreased steering angle.

Thus, it would be advantageous to find a way to decrease the load on the front axle of a truck.

In buses it is common to place the engine behind the driven rear axle. In principle this means an inverted placement compared to a truck (as described above). Thus, a big share of the tare weight of the bus will be on the driven rear axle. This gives good traction and driving ability. On the other hand the front axle will get a relatively low load, due to a low share of the tare weight lying on the front wheels. Especially under slippery conditions, this can give problems with the steering ability of the bus.

Thus, it would be an advantage to find a way to decrease the load on the rear axle of a bus of the type mentioned above.

Trucks with the engine and gearbox arranged over the front axle of the vehicle and equipped with a driven rear axle, normally have a propeller shaft system connecting the gearbox output shaft and the driven rear axle. The propeller shaft system allows only a certain amount of difference in angle and in eccentricity between its shaft ends. However, the practically possible differences are even more limited. This is a problem when designing a truck with short wheel base. The reason for this is that the propeller shaft becomes relatively short and the differences in angle relatively big. This gives an undesired limitation of how short the wheelbase of a truck can be. Thus, in this aspect, it would be desirable for a truck designer to get more design space. A known way to compensate for this problem is to arrange the engine and gearbox package in the vehicle with a slight inclination so that the difference in angle between the outgoing shaft of the gearbox and the propeller shaft will decrease and, thus, make it possible to shorten the wheelbase a little bit more. The disadvantage of this is that especially the gearbox, with its rear end, will come closer to the ground, and thus get more exposed to road obstacles.

The engine in a truck, such as described above, needs cooling. Normally a cooler is placed in front of the engine. The engine compartments in modern trucks are very densely packaged. This gives air flow problems in the engine compartment and thus cooling problems for the gearbox, which is placed just behind the hot engine. Therefore a modern truck is often equipped with a special cooling system for the gearbox. This makes the engine compartment even more densely packaged. In some vehicles, such as dumpers, the space conditions in the engine compartments are such that it is not suitable to arrange the cooler in close relation to the engine. This increases the complexity of the cooling problem. It would thus be advantageous to be able to get more free space in the engine compartment.

Heavy vehicles have legal and customer requirements on noise emissions. The engine and the gearbox are two components that largely contribute to the sound emission from the vehicle. The development of gearboxes has lately gone towards lower sound emissions from engaging teeth in the gearbox. Unfortunately, this is counteracted by that the vibration level from the engines tends to increase due to, amongst other things, different development steps taken for dealing with the demands coming from new exhaust emission legislation. Since the gearbox normally is attached to the engine, the vibrations from the engine are spread to the gearbox, and the gearbox becomes sort of a loudspeaker that emits vibrations from the engine as sound (noise) to the surroundings. It would be advantageous to be able to decrease the sound emission from heavy vehicles.

Volkswagen type 1 and Porsche 911 both have an engine-gearbox package arranged over the rear driven axle. The engine, gearbox and rear axle are built together as one package. The package is arranged so that most of the engine is behind the rear axle and the gearbox is in front of the rear axle. Porsche 914 and Porsche Boxter also have the engine, gearbox and rear axle built together, but instead here the engine is arranged in front of the rear axle and the gearbox behind the rear axle. Audi 100 has the same concept applied on a driven front axle, i.e. the package is arranged over the front axle. Citroen Traction Avante and Renault 4 are examples on how to apply the Volkswagen type 1 package concept on a driven front axle. The concept of building engine, gearbox and driven axle together in one package works well for cars, but when applied on heavy vehicles, such as e.g. trucks, it would be unpractical and unflexible to try to arrange a big truck engine-gearbox over a driven rear axle and at the same time make room for an efficient load carrier. There would be similar problems for dumpers and buses.

SE521643 shows a power train comprising, amongst other components, an engine, a main gearbox and a range gearbox. The engine and main gearbox are built together and arranged over the undriven front axle. The range gearbox is arranged just in front of the driven rear axle. The front axle load problem (see above) and the sound emission problem (see above) are not improved satisfactory. The cooling problem and the problem with the difference in angle and eccentricity between propeller shaft ends in trucks with short wheelbase (see above) also remain with this solution.

Pontiac Tempest, Porsche 924, 928, 944 and 968, Alfa Romeo Alfetta and Giulietta, and Volvo 300-series all have the engine in the vicinity of the front axle and the gearbox built together with the driven rear axle. The gearbox is placed in front of the rear axle. The problem with load on the front axle is decreased, but for heavy vehicles and driven bogie there is still a need for improvement. Further, there is no suggestion how to solve the cooling problem in densely packaged engine compartments nor how to solve the problem with the difference in angle and in eccentricity between drive shaft ends in trucks with short wheelbase (see above).

Trucks, especially heavy trucks, have parking brakes both for front wheels and rear wheels. This means an increased number of components in the vehicle. If a truck is empty, i.e. the load over the rear axle is low and the load over the front axle is relatively high (due to cab, engine, gearbox and other components arranged in the front and over the front axle of the vehicle), then to be sure having enough brake effect from the parking brake in all situations, the vehicle will need a parking brake both on the front and the rear axle.

It is desirable to decrease the axle load on the axle that has the engine in its vicinity and at the same time increase drivability, steering ability (for bus as above), the possibility of designing trucks with short wheelbase and the cooling performance of the engine. It is also desirable to eliminate the need of a parking brake (for trucks as above) on both front and rear wheels and at the same time to eliminate the need of a special gearbox cooling system. It is also desirable to decrease the sound emission from the vehicle. It is also desirable to, in a truck of the type mentioned above, decrease steering forces and increase steering angle.

The arrangement according to an aspect of the invention comprises a vehicle with wheels arranged on a front axle and rear axle, where at least one of said axles is driven, an engine arranged in the vicinity of rear or front end of said vehicle, said engine comprising an output shaft connected to said driven axle via a transmission system for transmitting driving power from said engine to said driven axle, said transmission system comprising at least a multiple-speed gearbox for causing variable gear ratio between said engine and driven axle. The engine and said gearbox are arranged on each side of said driven axle, and are connected only via a power transmitting device so that an engine block of said engine is separated from a gearbox housing of said gearbox.

A major advantage of the arrangement according to an aspect of the invention for the types of vehicles mentioned is that a better weight distribution is achieved. For trucks of the type mentioned above this results in reduced steering forces and a possibility to achieve a better steering angle, since a smaller tire dimension can be chosen. Correspondingly, for a bus of the type mentioned above this gives a better steering ability. Further, a simpler and cheaper bedding of engine in rubber cushions can be chosen, since only the weight of the engine is left to be taken care of. Special cooling for the gearbox will not be needed. Since the engine and the gearbox are separated, an overall noise reduction for the vehicle will be possible. In a special bogie embodiment with the gearbox placed between the axles the noise reduction would be even better, since the increased number of wheels will work like a sound screen. With the gearbox separated from the engine, there will be more space in the engine compartment and, thus, a better air flow around the engine and the cooler of the engine can be achieved. This gives the possibility to increase the performance of the cooling system and in the extension also the performance of the engine. For the case with a truck having an engine placed above the front axle and having rear wheel drive (see above), the decreased load on the front axle gives decreased wear on tires of the front wheels, makes it easier to load the vehicle with cargo (since the load on the front axle is not near maximum allowable load for front axle), and the better weight distribution gives the vehicle a better traction and driving ability for driven rear axle.

According to an advantageous first embodiment of the arrangement according to an aspect of the invention, said power transmitting device is a propeller shaft where one end of the propeller shaft is connected directly or indirectly to an input shaft of said gearbox. In this embodiment said input shaft is placed higher relative to the ground than the rotational axis of a driven wheel differential gearing of said driven axle and an output shaft of said gearbox is connected to said differential gearing. In a further development of this embodiment the output shaft of said engine, the input shaft and the propeller shaft are placed on mainly the same level relative to the ground and simultaneously higher relative to the ground than said rotational axis of said driven wheel differential gearing. The advantage is that this embodiment gives a truck designer the possibility of designing trucks with even shorter wheelbase than would normally be possible with known technique. The engine would not need to be arranged with a slight inclination, because there is no difference in angle and in eccentricity between the shaft ends of the propeller shaft, to compensate for.

Thus, the engine and the gearbox would be more protected from hitting ground obstacles. The vehicle will get a possibility for better ground clearance without increasing the total height of the truck.

According to an advantageous second embodiment of the arrangement according to an aspect of the invention, said power transmitting device comprises a first hydraulic motor/pump arranged on the engine side of said driven axle and a second hydraulic motor/pump arranged on the gearbox side of said driven axle, said first and second hydraulic motor/pump being connected via hydraulic hoses. The advantage of this is a much increased flexibility in e.g. truck architecture, e.g. by using the space between the engine and the rear axle for batteries, other equipment or cargo. In a special embodiment the hydraulic motor/pump can be arranged in a trailer, which is attached to said vehicle. The advantage is increased traction and driveability.

According to an advantageous third embodiment of the arrangement according to an aspect of the invention, said power transmitting device comprises a first electric motor/generator arranged on the engine side of said driven axle and a second electric motor/generator arranged on the gearbox side of said driven axle, said first and second electric motor/generator being connected through electric wires. The advantage of this is a much increased flexibility in e.g. truck architecture, e.g. by using the space between the engine and the rear axle for batteries, other equipment or cargo. In a special embodiment the electric motor/generator can be arranged in a trailer, which is attached to said vehicle. The advantage is increased traction and driveability.

In a further advantageous fourth embodiment said gearbox is relatively fixed to a frame of said vehicle. Thus, said gearbox is not movable vertically together with a suspension system of said driven wheels. In a further development of this embodiment said driven axle comprises differential gearing and bevel gear. According to an aspect of the invention said gearbox, differential gearing and bevel gear are attached directly to a frame of the vehicle. The gearbox, differential gearing and bevel gear are further not movable vertically in a suspension system together with said driven wheels. Both mentioned embodiments gives a compact and light axle installation with individual wheel suspension.

According to an advantageous fifth embodiment of the arrangement according to an aspect of the invention, said gearbox, differential gearing and bevel gear are integrated and arranged in a common unit. The advantage is a compact build up. In a further development of this embodiment a lubrication system is arranged in said unit for lubricating said gearbox, differential gearing and bevel gear. A lubrication system common for the gearbox, the differential gearing as well as the bevel gear can be used. In an embodiment with driven bogie axels one lubrication system can be used for all the mentioned components, i.e. also for the respective differential gearing of the respective driven axle. An aspect of the invention according to this embodiment is of coarse also applicable if there is only one driven axle. Thus, the gearbox is arranged between the driven and the undriven axle. Such axle arrangement is applicable both as front axles and as rear axles. The bogie arrangement or the arrangement with one driven and one undriven axle can be equipped with steerable or not steerable wheels and as a front or rear axle arrangement in the vehicle.

According to an advantageous sixth embodiment of the arrangement according to an aspect of the invention, at least one first power take off is arranged on said engine and at least one second power take off is arranged on said gearbox. An aspect of the invention makes it possible to have the power take offs nearer the power consumers.

According to an advantageous seventh embodiment of the arrangement according to an aspect of the invention said vehicle is a truck with an arrangement with parking brake function arranged in the vicinity of said rear axle and that said parking brake arrangement only acts on said rear wheels. Since, according to an aspect of the invention, the load over the front wheels decreases and the load over the rear wheels increases, it becomes possible to arrange a parking brake that is only acting on the rear wheels. The advantage is that the number of components in the truck can be minimized. No parking brake on the front wheels further decreases the load over the front axle.

According to an advantageous eight embodiment of the arrangement according to an aspect of the invention shafts of said gearbox are arranged substantially parallel to drive shafts of said driven axle. This enables the bevel gear to be placed on the low-torque input side of the gearbox. Thereby, the torque in the comparably expensive bevel gear is reduced significantly. Thus, this arrangement makes it possible to have a cost efficient bevel gear.

According to an another advantageous embodiment of the arrangement according to an aspect of the invention there is a bevel gear in each of said driven axles in a boggie arrangement. Said bevel gears are arranged in such a way compared to said driven axles that said bevel gears are substantially identical. The advantage is that identical bevel gear can be used for more than one driven axle.

According to another embodiment said bevel gears are connected to or integral with and driven by a common shaft, where said common shaft also can be a shaft in said multi-speed gearbox. Thus the number of components can be further rationalized.

According to an another advantageous embodiment of the arrangement according to an aspect of the invention said common shaft intersects a longitudinal median plane of the vehicle and a median plane between said driven rear axles in substantially the same point, so that said driven rear axles can be substantially identical. This embodiment makes it possible to have substantially both a first and a second bevel gears identical. And in the same arrangement both a first and a second entire driven rear axle identical.

BRIEF DESCRIPTION OF THE DRAWINGS

The present invention will be described in greater detail below with reference to accompanying drawings which, for the purpose of exemplification, show further preferred embodiments of the invention and also the technical background.

DETAILED DESCRIPTION

Figure 1:
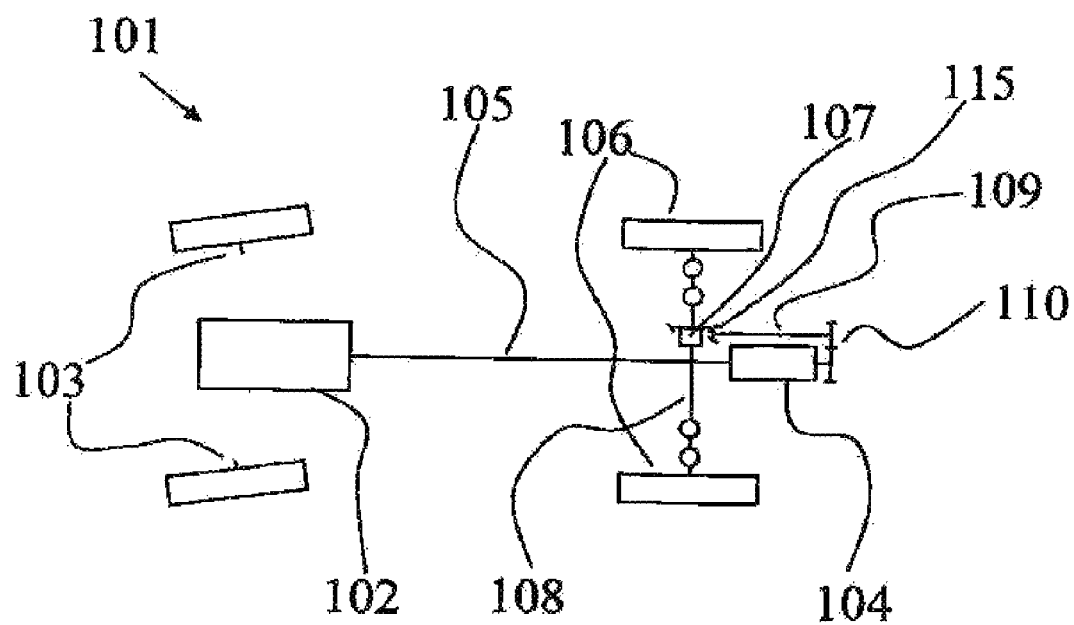
FIG. 1 shows diagrammatically a view from above of an embodiment of an aspect of the invention with a single driven axle.

FIG. 1 shows a drive line configuration 101 for a vehicle according to an aspect of the invention where an engine 102 is arranged over a front axle 103 of the vehicle, and where the front axle comprises a pair of steerable undriven front wheels. The driving power from the engine 102 is transmitted to a pair of driven wheels 106 via a propeller shaft 105 connected to an input shaft of a multiple-speed gearbox 104, and an output shaft of the gearbox further being connected to a wheel differential gearing 107 of a rear driven axle 108 via a pair of gear wheels 110, a short axle 109 and a bevel gear 115. Said rear axle is transmitting the driving power further out to the respective driven rear wheel, i.e. the wheels being connected to the rear driven axle. An engine block of said engine is separated from a gearbox housing of said gearbox. According to an aspect of the invention the engine is arranged over the front axle and the gearbox is arranged behind the driven rear axle. The advantages, as mentioned above, particularly comes forward when the inventive arrangement is used in a truck.

Figure 2:
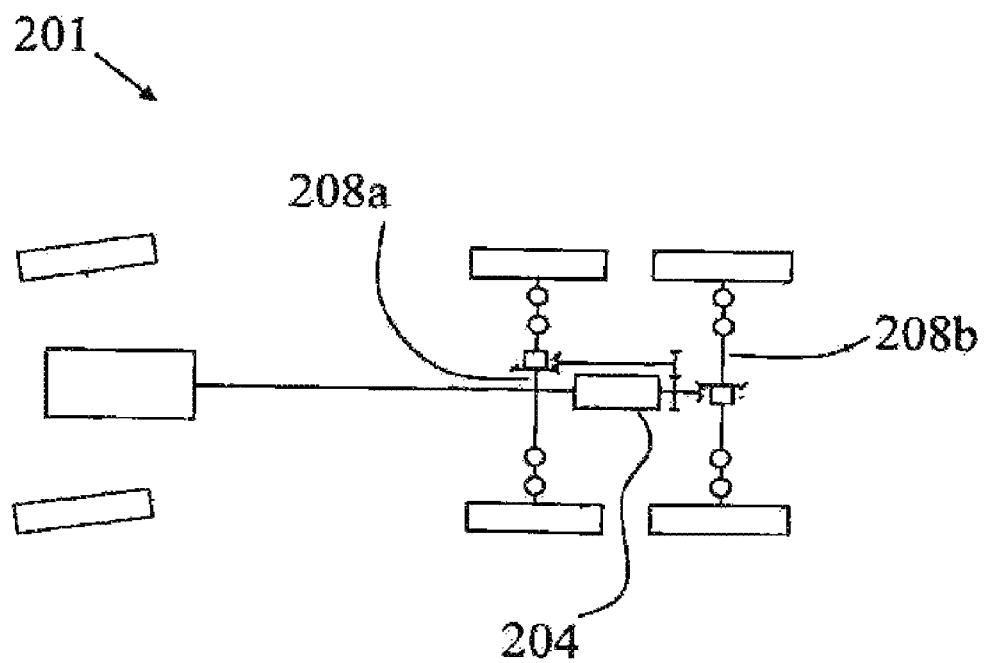
FIG. 2 shows diagrammatically a view from above of an embodiment of an aspect of the invention with two rear driven axles.

FIG. 2 shows a drive line configuration 201 similar to the one shown in FIG. 1, but with the difference that the embodiment in FIG. 2 has another driven rear axle 208b arranged behind the gearbox 204. Thus, an output shaft of the gearbox 204 is connected to a first driven rear axle 208a and said second driven rear axle 208b. It is also possible to have more than two driven rear axles. The gearbox is then arranged between two of the three or more-driven axles. In an alternative embodiment of the one shown in FIG. 2 the second rear axle 208b can be undriven.

Figure 3:
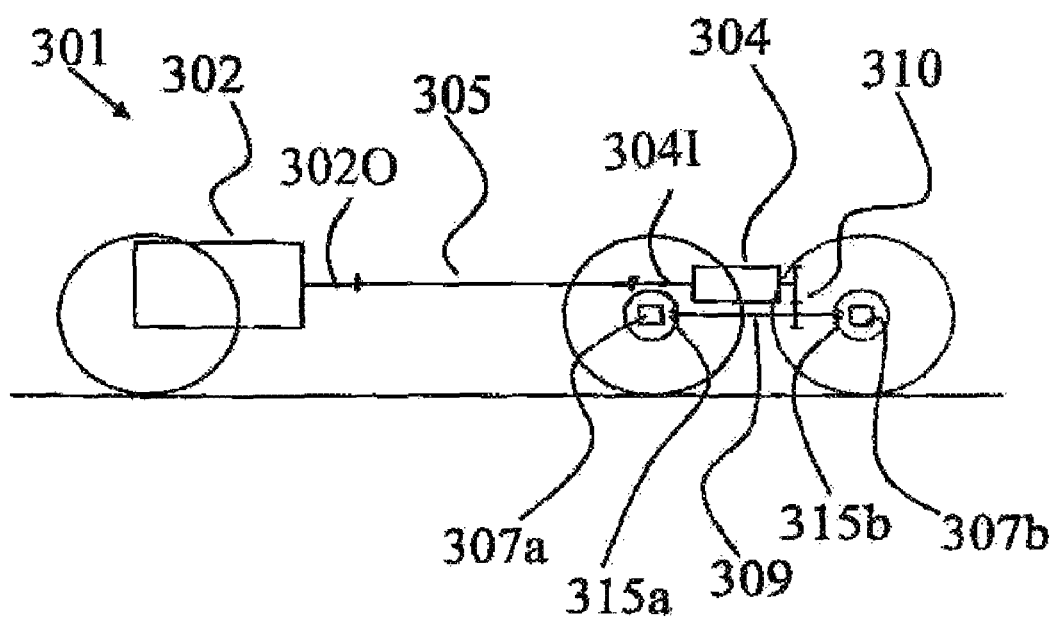
FIG. 3 shows diagrammatically a side view of an embodiment of an aspect of the invention with a single driven axle or two driven axles.

FIG. 3 shows a side view of a drive line configuration 301 similar to the one shown in FIG. 1 or 2 (see wheel, part of short axle 309, wheel differential gearing 307b and bevel gear 315b drawn with dashed line). The embodiment of FIG. 3 differs from the one in FIG. 1 or 2 in that the pair of gear wheels 310 on the output shaft of the gearbox 304 are arranged above or close to above one another. This means that the corresponding short axle 309 connecting the output shaft of the gearbox 304 to the bevel gear 315a and the wheel differential gearing 307a of the driven axle or axles (if equipped with driven second axle, i.e. see dashed lines) can be arranged under the gearbox 304. Thus, the input shaft of said gearbox is placed higher relative to the ground than the rotational axis of the wheel differential gearing 307a (or gearings 307a and 307b). As shown in FIG. 3 the output shaft 302O of the engine 302, the input shaft 304I of the gearbox 304 and the propeller shaft 305 are placed on mainly the same level relative to the ground and simultaneously higher relative to the ground than said rotational axis of said driven wheel differential gearing 307a and 307b (if equipped with such). This embodiment makes it possible to build trucks with even shorter wheelbase than would normally be possible with known technique. The engine can be arranged without inclination, because there is no difference in angle and in eccentricity between the shaft ends of the propeller shaft 305, to compensate for. In an alternative embodiment the engine and the propeller shaft can be arranged with a small inclination at the same time as the input shaft of the gearbox and at least one end of the propeller shaft are placed higher relative to the ground than said rotational axis of the driven wheel differential gearing.

Figure 4:
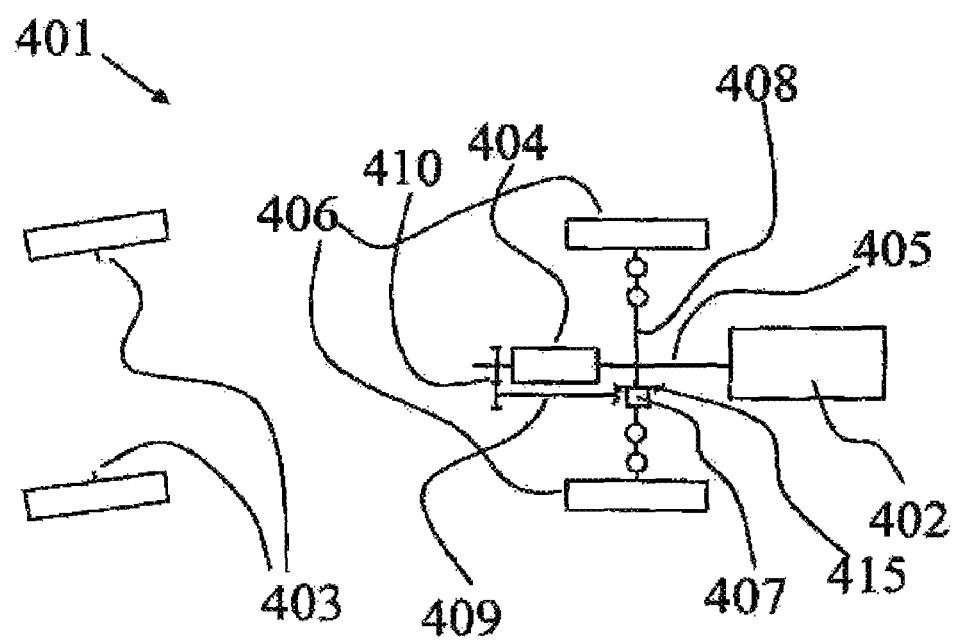
FIG. 4 shows diagrammatically a view from above of an embodiment of an aspect of the invention with a single driven axle.

FIG. 4 shows a drive line configuration 401 according to an aspect of the invention that is best suited for a bus application. An engine 402 is here arranged in the rear end of the vehicle. The driving power is transmitted to a pair of driven rear wheels 406 in the corresponding way, as described in the embodiments above, via a propeller shaft 405, a multiple-speed gearbox 404, a pair of gear wheels 410, a short axle 409, a bevel gear 415, a wheel differential gear 407 and a driven axle 408. The front wheels 403 are steerable and undriven. Also here, according to an aspect of the invention, an engine block of said engine 402 is separated from a gearbox housing of said gearbox 404 and the gearbox is arranged on the opposite side of the driven axle 408 compared to the engine.

Figure 5:
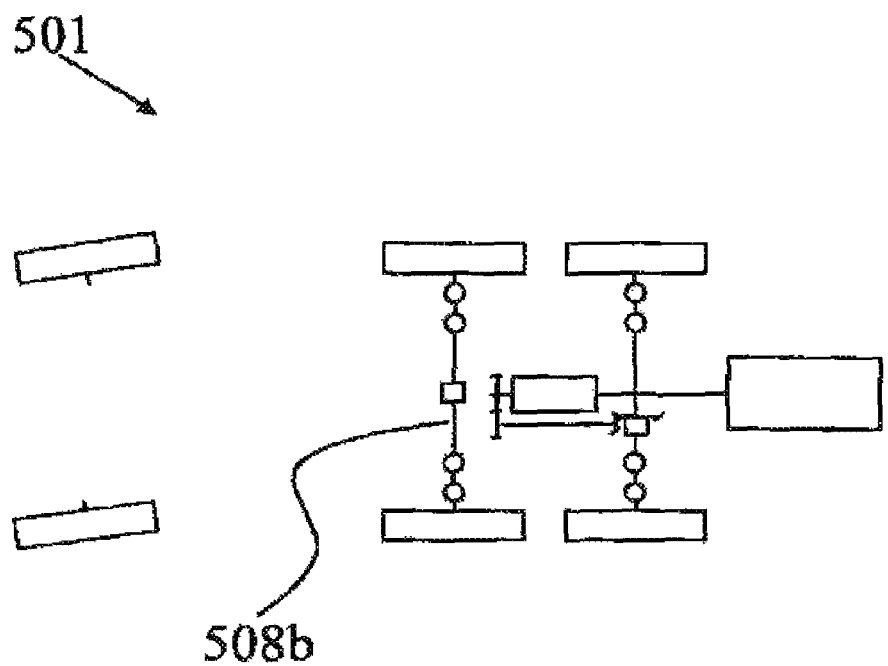
FIG. 5 shows diagrammatically a view from above of an embodiment of an aspect of the invention with one driven rear axle and one undriven rear axle.

FIG. 5 shows an alternative embodiment of the one shown in FIG. 4, with an additional undriven rear axle 508b. The undriven axle is the only difference between the two mentioned embodiments.

Figure 6:
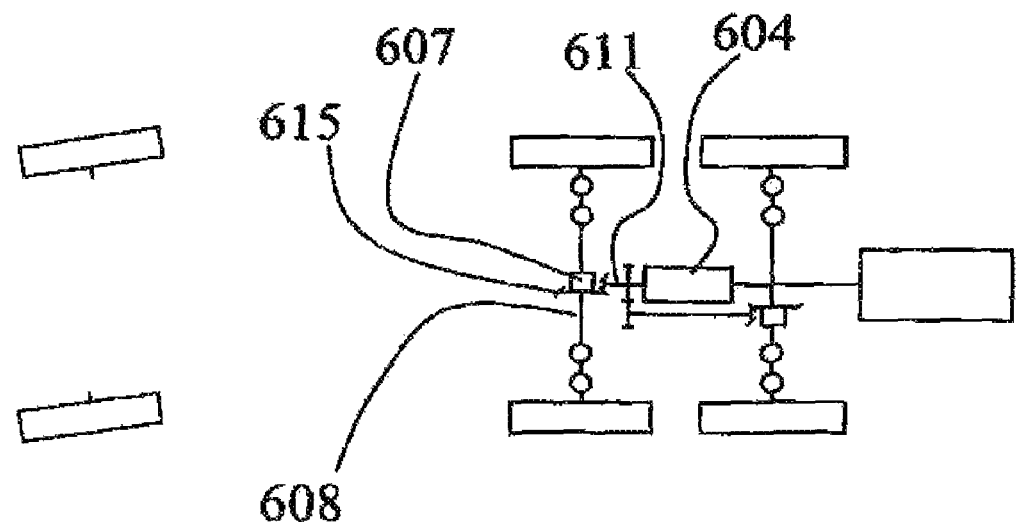
FIG. 6 shows diagrammatically a view from above of an embodiment of an aspect of the invention with two rear driven axles.

FIG. 6 shows a further alternative embodiment of the one shown in FIG. 5, where an additional rear axle 608, corresponding to the undriven rear axle 508b in FIG. 5, is driven via an extended output shaft 611 of the gearbox 604 and another bevel gear 615 with wheel differential gearing 607.

Figure 7:
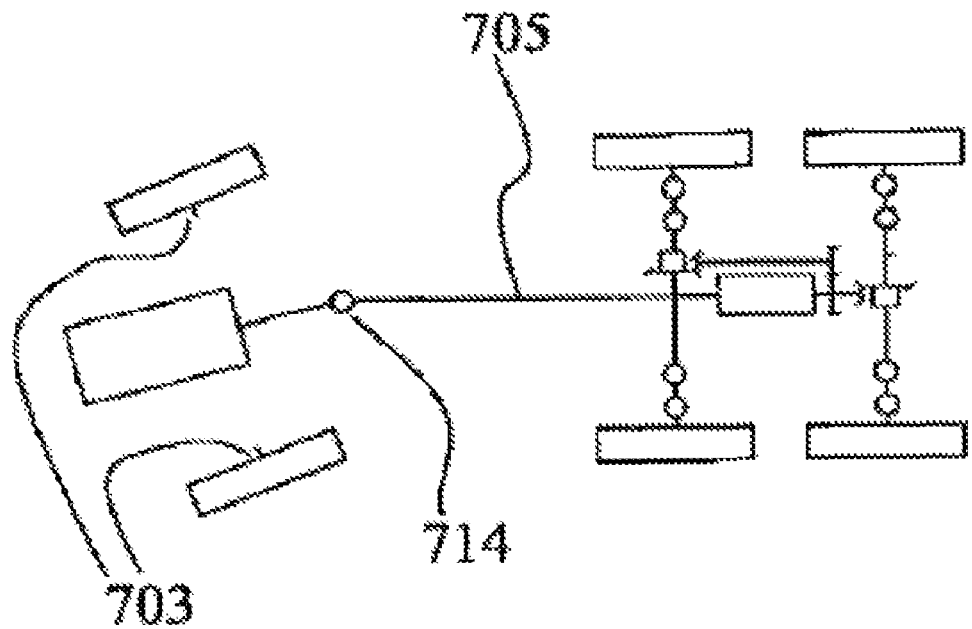
FIG. 7 shows diagrammatically a view from above of an embodiment of an aspect of the invention with two rear driven axles and an articulated framework.

FIG. 7 shows a further development of the embodiment in FIG. 2. The only difference between the two embodiments is that an additional way of steering the vehicle has been added. An articulation is arranged on the body or the framework of the vehicle, suitably somewhere just behind the front wheels, and thus the propeller shaft 705 is also articulated in a position indicated 714. As shown in FIG. 7 the wheels of the front axle 703 are also steerable. Consequently the embodiment according to FIG. 7 shows an aspect of the invention applied on a vehicle with a combination of two systems for steering the vehicle.

In alternative embodiments of the embodiments shown in each of the FIG. 1, 2 or 7, these can be equipped with an all wheel drive arrangement (not shown). For the embodiments of FIGS. 1 and 2, this can preferably be solved by distributing driving power to the front wheels via an additional shaft connecting the output shaft of the gearbox with the front axle, and the front axle preferably being equipped with another bevel gear and wheel differential gearing. For the embodiment of FIG. 7 this can also be solved via an additional shaft connecting the output shaft of the gearbox with the front axle, said shaft being articulated. Another possible solution is to have a hydraulic motor arranged in the vicinity of the output shaft of the gearbox and driven by said output shaft. The transmission of the driving power to the front axle would be via hoses and a hydraulic pump, which pump would be connected to and arranged in the vicinity of the front axle, and thus driving the front axle. This embodiment could also be applied on vehicles with a steering system based on only articulation of the framework. Such vehicle could also have only four wheels, two at the front end and two at the back end of the vehicle, and all four wheels being driven. Another alternative solution could be based on an electric motor/generator concept instead of the above mentioned hydraulic solution.

The embodiments in the different figures indicate that the driven axle or axles is/are of the individual suspension type. Thus, in a preferred embodiment the gearbox and differential gearing of the respective driven axles are fixed to the frame 810, 910 (shown in phantom in FIGS. 8 and 9).

Figure 8:
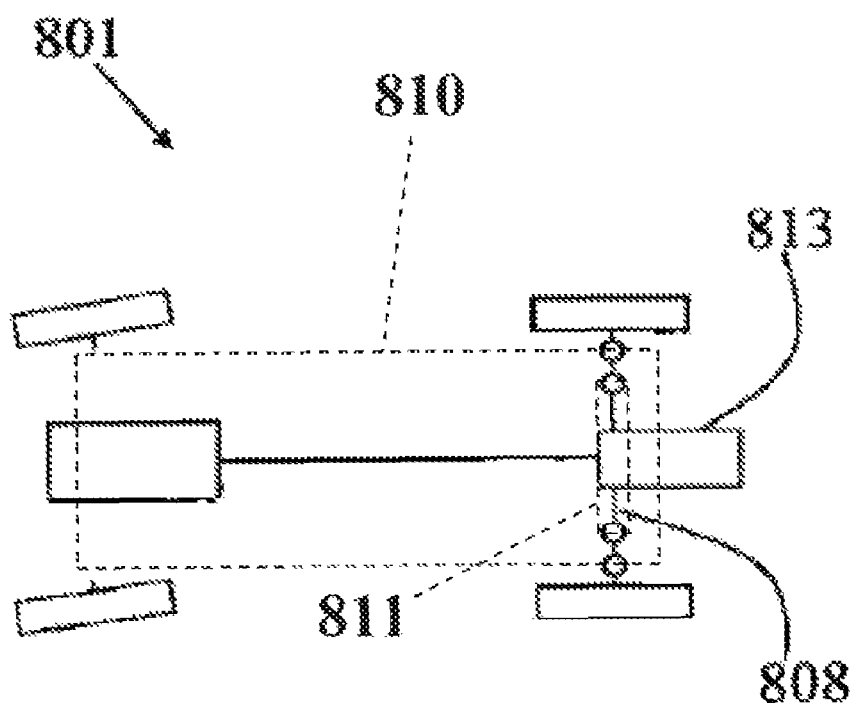
FIG. 8 shows diagrammatically a view from above of an embodiment of an aspect of the invention with a single rear driven axles and where at least gearbox, wheel differential gearing and bevel gear are integrated and arranged in a common unit.
Figure 9:
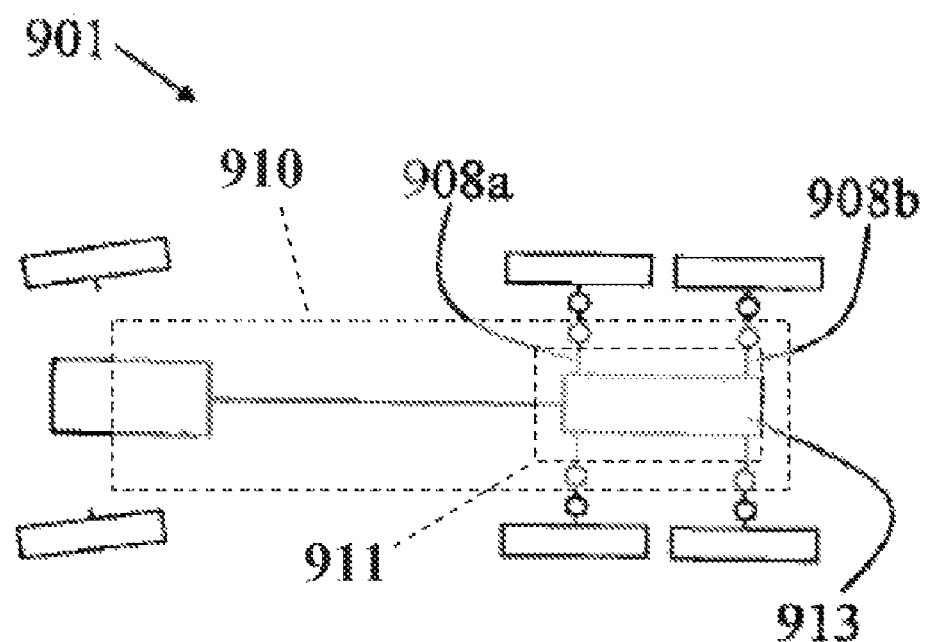
FIG. 9 shows diagrammatically a view from above of an embodiment of an aspect of the invention with two rear driven axles and where at least gearbox, wheel differential gearings and bevel gears are integrated and arranged in a common unit.

FIGS. 8 and 9 show respectively alternative embodiments of the embodiments shown in FIGS. 1 and 2. In the drive line configurations 801 and 901 in FIGS. 8 and 9 respectively the gearbox, bevel gear and differential gearing of the respective driven axles 808, 908a, 908b are fixed to the frame. The boxes, 813 and 913, indicates an integrated package, which comprises at least a gearbox with input and output shafts, a clutch, bevel gear, wheel differential gearing and a lubrication system common for at least the gearbox, bevel gear and at least one wheel differential gearing (number dependent on how many driven axles).

Figure 10:
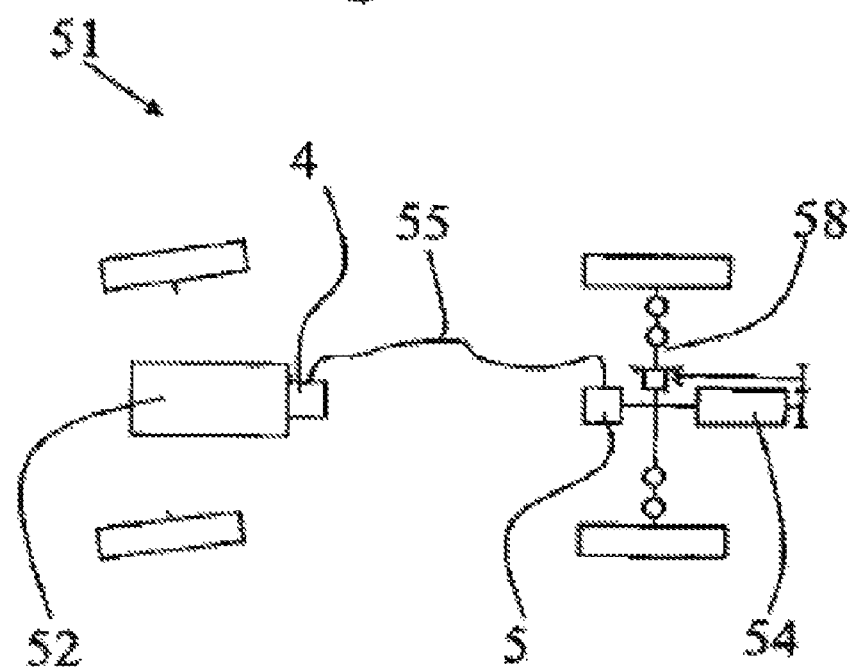
FIG. 10 shows diagrammatically a view from above of an another embodiment of an aspect of the invention with a single driven axle.

FIG. 10 shows an embodiment according to an aspect of the invention where in a vehicle 51 the transmission system, for transmitting driving power from an engine 52 to a driven axle 58, is not a propeller shaft. Instead, according to one first alternative of this embodiment, a hydraulic pump 4 is arranged on the output shaft of the engine 52 and, thus, driven by the engine 52, and further, a hydraulic motor 5 is arranged on the input shaft of a multiple-speed gearbox 54. The hydraulic pump and motor are connected via hydraulic hoses 55, thus transmitting the driving power. The further transmission of the driving power from the gearbox and out to the driven wheels is done in a similar way as for the embodiment of FIG. 1. In a situation when the vehicle 51 is engine braked it is possible to make the motor 5 work as a pump and analogous the hydraulic pump 4 can work as a motor. In a second alternative of this embodiment the pump 4 is an electric generator and reference number 5 is then an electric motor and, thus, 55 is a pair of electric wire.

In a trailer development of the embodiment shown in FIG. 10 a disconnectable first trailer can be connected to the vehicle shown in FIG. 10, thus the vehicle being a tractor vehicle. The trailer is equipped with a corresponding multiple-speed gearbox with an output shaft connected to a driven axle in the trailer. A hydraulic motor or alternately an electric motor can be arranged in the trailer for driving an input shaft of said trailer gearbox. Thus, further hydraulic hoses or corresponding pair of electric wire are arranged for transmitting driving power from the hydraulic pump or electric generator 4 and said hydraulic or electric motor in the first trailer. In an alternative trailer embodiment a second disconnectable trailer can be connected to the tractor vehicle. This second trailer can also be equipped with a driven axle and gearbox such as the first trailer or this second trailer can be an ordinary undriven trailer.

An embodiment according to FIG. 10 gives enhanced possibilities to take care of and store braking energy in, e.g., different kinds of pressure tanks or batteries, depending on the system being hydraulic or electric. The braking energy can be used later as e.g. driving power or to drive other systems in the vehicle.

Figure 11:
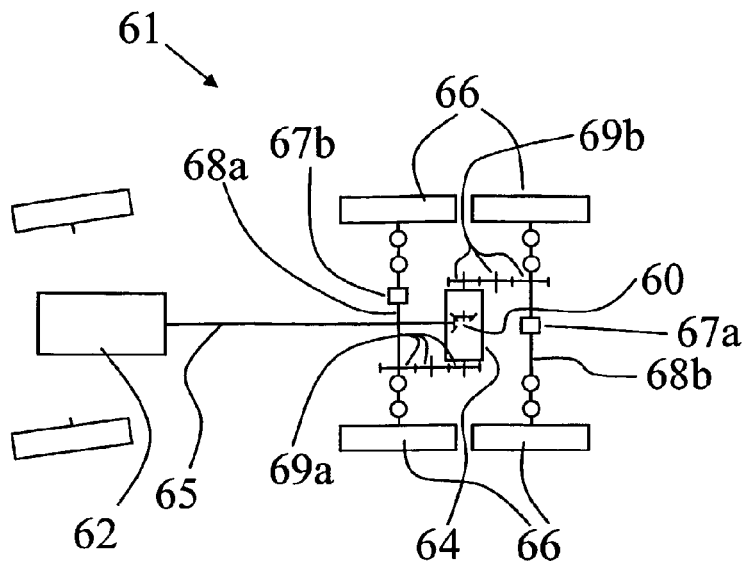
FIG. 11 shows diagrammatically a view from above of an embodiment of an aspect of the invention where shafts of a gearbox are arranged substantially parallel to drive shafts of a driven axle.

The embodiment in FIG. 11 shows a configuration 61 where shafts of a multiple-speed gearbox 64 are arranged substantially parallel to drive shafts of a first 68a and second 68b driven rear axle. The driving power from an engine 62 is transmitted to the driven wheels 66 via a propeller shaft 65 connected to an input shaft of the gearbox 64 and the only bevel gear 60, which is arranged in the gearbox 64. The drive force is further transmitted to the rear axles 68a and 68b respectively via a first 69a and a second 69b gear wheel arrangement, in the shown embodiment comprising three gear wheels. The first and second gear wheel arrangement comprises respectively a first gear wheel arranged on one of two output shafts of the gearbox, a second gear wheel, meshing with said first gear wheel, is arranged on an axle as an intermediate gear wheel and a third gear wheel, meshing with said second gearwheel, is arranged on each of said driven rear axles 68a and 68b. The driven rear axles 68a and 68b are respectively equipped with a first and a second wheel differential gearing 67a and 67b. Said rear axles 68a and 68b are transmitting the driving power further out to the respective driven rear wheels 66, i.e. the wheels are connected to the rear driven axles.

Figure 12B:
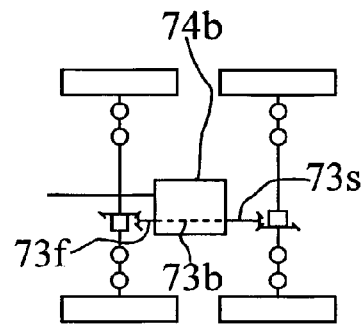
FIGS. 12B, 12C and 12D show different variants of the embodiment in FIG. 12.
Figure 12A:
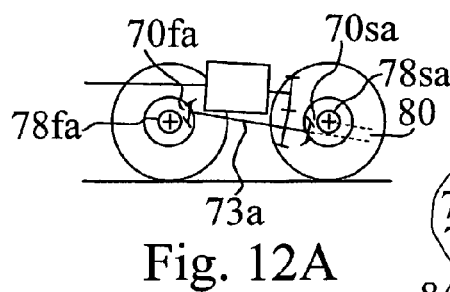
FIG. 12A shows diagrammatically a side view of the same embodiment as in FIG. 12 for the case of bevel gear arrangements with an offset between the bevel gear axes.
Figure 12C:
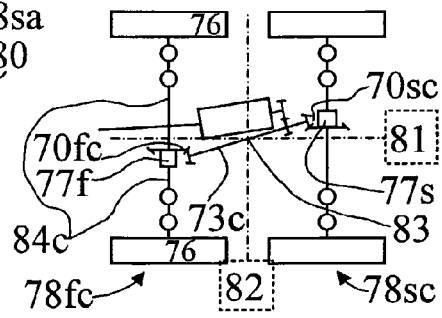
Figure 12:
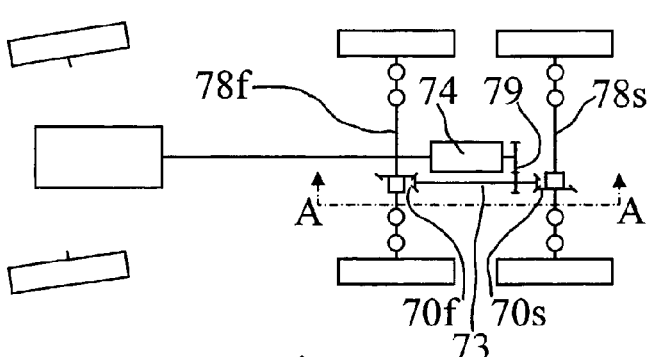
FIG. 12 shows diagrammatically a view from above of an embodiment of an aspect of the invention where the bevel gear arrangements of the front and rear driven axles are identical.

The embodiment of FIG. 12 shows a configuration 71 where a bevel gear 70f of a first driven rear axle 78f is arranged in a mirror-opposed way to a bevel gear 70s of a second rear axle 78s. Thereby, the bevel gears 70f and 70s can be identical. Furthermore, a common (intermediate) shaft 73 drives the bevel gears 70f and 70s. The common shaft 73 is driven by a multiple-speed gearbox 74 via a gear wheel arrangement 79.

In bevel gears that are used in driven axles in vehicles, there is usually an offset distance between the axes of rotation of the bevel gear wheels. FIG. 12A shows a side view along the line A-A in FIG. 12. There is an offset distance 80 between the axes of rotation in bevel gears 70fa and 70sa of first and second rear axles 78fa and 78sa. By arranging the common (intermediate) shaft 73a inclined with respect to the horizontal level it is possible to maintain the advantage in FIG. 12 of having the bevel gears 70fa and 70sa identical.

FIG. 12B shows a variant of the embodiment in FIG. 12 where the multi-speed gearbox 74b has an output shaft 73b with two external shaft ends 73f and 73s. The output shaft 73b corresponds to the common (intermediate) shaft 73 in FIG. 12. However, since the output shaft 73b is a part of the gearbox, a separate gear wheel arrangement 79 as in FIG. 12 is not necessary in the variant in FIG. 12B.

FIG. 12C shows a variant of the embodiment in FIG. 12 where it is possible to have not only the bevel gears 70fc and 70sc but also substantially the entire driven rear axles 78fc and 78sc identical. This can be accomplished if the common (intermediate) shaft 73c intersects the longitudinal median plane 81 of the vehicle and the median plane 82 between the driven rear axles 78fc and 78sc in substantially the same point 83. By arranging the common (intermediate) shaft 73c with an appropriate angle to the longitudinal median plane 81, the bevel gears 70fc and 70sc as well as the wheel differential gearings 77f and 77s could be located in such a way that the shafts 84c that connect the wheel differential gearing 77f with the wheels 76 could be identical. Thereby, costs can be reduced.

Figure 12D:
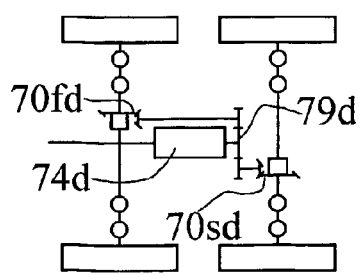

FIG. 12D shows an alternative embodiment where the bevel gears 70fd and 70sd are connected by a gear wheel arrangement 79d. In contrast to the embodiment in FIG. 12, there is no common (intermediate) shaft joining the bevel gears. The output of the multi-speed gearbox 74d is connected to the gear wheel arrangement 79d. With an appropriate design of the gear wheel arrangement 79d, it is possible to have identical bevel gears, driven rear axles, and/or shafts, as described for FIGS. 12, 12A, 12B and 12C.

In an alternative embodiment of an aspect of the invention the engine and at least a part of the multiple-speed gearbox are arranged on each side of the driven axle. Also in this embodiment the engine and the gearbox are connected only via a power transmitting device so that an engine block of said engine is separated from a gearbox housing of said gearbox. For example the part of the gearbox containing the input shaft of the gearbox could, in the above shown embodiments of FIGS. 1 to 7 and 10, be arranged on the same side of the driven axle as the engine. Thus, the main part of the gearbox is not arranged on the same side of the driven axle as the engine.

The embodiments shown in FIGS. 2, 3 (including the dashed parts), 6, 7, 9, 11 and 12 all show so called tandem bogies with all four wheels being driven. FIG. 5 shows a bogie with only the rear pair of wheels being driven. A bogie means an axle sub system with common suspension comprising at least two axles, and where at least one of said at least two axles are driven.

In the shown embodiments according to an aspect of the invention, with the engine in one end of the vehicle and the gearbox in the other, it is possible to arrange a power take off on said gearbox and thus having power supply near a consumer in that part of the vehicle.

In said embodiments where the rear axle is the driven axle and the engine is arranged over the front axle of the vehicle, an arrangement 811 or 911 with parking brake function can be arranged in or in the vicinity of said rear axle as shown in phantom in FIGS. 8 and 9. Thus, the parking brake function only acts on the rear wheels.

The transmission of the driving power from an engine to a multiple-speed gearbox often includes a clutch for making it possible to disconnect the engine from the gearbox during gear change. To maximise an even weight distribution between the front and rear of a vehicle according to an aspect of the invention a clutch included in the transmission system can be arranged in the vicinity of the gearbox.

The invention must not be regarded as being limited to the exemplary embodiments described above, a number of further variants and modifications being feasible without departing from the scope of the following claims. It must be mentioned that a placement of the clutch in the vicinity of the engine is also possible.

What is claimed is:

1. A vehicle comprising wheels arranged on a front axle and at least two parallel, non-coaxial rear axles, where of the axles at least one of the rear axles is driven, an engine arranged in a vicinity of a front end of the vehicle, the engine comprising an output shaft connected to the at least one driven axle via a transmission system for transmitting driving power from the engine to the at least one driven axle, the transmission system comprising at least a multiple-speed gearbox for causing variable gear ratio between the engine and the at least one driven axle, wherein the engine and at least a part of the gearbox are arranged on opposite sides of the at least one driven axle, and are connected only via a propeller shaft, so that an engine block of the engine is separated from a gearbox housing of the gearbox, the gearbox is arranged between two of the adjacent rear axles, wherein one end of the propeller shaft is connected directly or indirectly to an input shaft of the gearbox, the input shaft is placed higher relative to the ground than a rotational axis of a driven wheel differential gearing of the at least one driven axle, and an output shaft of the gearbox is connected to the differential gearing.

2. A vehicle as in claim 1, wherein the engine and the gearbox are arranged on opposites sides of the at least one driven axle.

3. A vehicle as in claim 2, wherein the output shaft of the engine, the input shaft and the propeller shaft are placed on mainly the same level relative to the ground and simultaneously higher relative to the ground than the rotational axis of the driven wheel differential gearing.

4. A vehicle as in claim 1 or 2, where the vehicle is equipped with an axle sub system with common suspension comprising at least two axles, and where one of the at least two axles is the at least one driven axle, wherein the gearbox is arranged between the at least two axles in the axle sub system.

5. A vehicle as in claim 1 or 2, wherein the gearbox is relatively fixed to a frame of the vehicle and the gearbox is not movable vertically together with a suspension system of the wheels of the at least one driven axle.

6. A vehicle as in claim 5, where the transmission system further comprises the differential gearing and a bevel gear, wherein the gearbox, differential gearing and bevel gear are relatively fixed to the frame and the gearbox, differential gearing and bevel gear are not movable vertically together with the suspension system.

7. A vehicle as in claim 6, wherein the gearbox, differential gearing and bevel gear are integrated and arranged in a common unit.

8. A vehicle as in claim 7, wherein a common lubrication system is arranged in the common unit for lubricating the gearbox, differential gearing and bevel gear.

9. A vehicle as in claim 8, wherein a bogie is arranged in the vehicle comprising at least two driven axles, and where the gearbox is arranged between the at least two driven axles and the lubricating system is arranged to lubricate the gearbox, differential gearing and bevel gear of both the driven axles.

10. A vehicle as in claim 1 or 2, wherein at least one power take off is arranged on the gearbox.

11. A vehicle as in claim 1 or 2, where the rear axle is the at least one driven axle and the engine is arranged over the front axle of the vehicle, wherein an arrangement with parking brake function is arranged proximate the rear axle and the parking brake function only acts on the rear wheels.

12. A vehicle as in claim 1 or 2, where the transmission system further comprises a clutch for alternately connecting/disconnecting the engine and the driven wheels of the at least one driven axle, wherein the clutch and the gearbox are integrated and arranged in a common clutch-gearbox package.

13. A vehicle as in claim 1, wherein gear shafts of the gearbox are arranged substantially parallel to drive shafts of the at least one driven axle.

* * * * *